United States Patent
Fisher et al.

(10) Patent No.: US 7,480,017 B2
(45) Date of Patent: Jan. 20, 2009

(54) MICRODISPLAY

(75) Inventors: Arthur D. Fisher, Burlington, MA (US); Ali Ersen, Newton, MA (US)

(73) Assignee: Radiant Images, Inc., Wilmington, DE (US)

( * ) Notice: Subject to any disclaimer, the term of this patent is extended or adjusted under 35 U.S.C. 154(b) by 562 days.

(21) Appl. No.: 11/215,506

(22) Filed: Aug. 30, 2005

(65) Prior Publication Data

US 2006/0061519 A1   Mar. 23, 2006

Related U.S. Application Data

(60) Provisional application No. 60/610,677, filed on Sep. 17, 2004.

(51) Int. Cl.
*G02F 1/1335* (2006.01)
(52) U.S. Cl. ......................................... 349/96
(58) Field of Classification Search .................. 349/96
See application file for complete search history.

(56) References Cited

U.S. PATENT DOCUMENTS

| | | | |
|---|---|---|---|
| 224,224 A | 2/1880 | Renwick | |
| 3,426,143 A | 2/1969 | Anderson | |
| 3,941,901 A | 3/1976 | Harsch | |
| 4,688,897 A | 8/1987 | Grinberg et al. | |
| 4,704,002 A * | 11/1987 | Kikuchi et al. | 349/43 |
| 5,471,330 A * | 11/1995 | Sarma | 349/43 |
| 5,986,730 A | 11/1999 | Hansen et al. | |
| 6,122,103 A | 9/2000 | Perkins et al. | |
| 6,190,933 B1 | 2/2001 | Shimabukuro et al. | |
| 6,243,199 B1 | 6/2001 | Hansen et al. | |
| 6,288,840 B1 | 9/2001 | Perkins et al. | |
| 6,312,968 B1 | 11/2001 | Shimabukuro et al. | |
| 6,365,936 B1 | 4/2002 | Shimabukuro et al. | |
| 6,399,166 B1 | 6/2002 | Khan et al. | |
| 6,452,724 B1 | 9/2002 | Hansen et al. | |
| 6,521,950 B1 | 2/2003 | Shimabukuro et al. | |
| 6,532,111 B2 | 3/2003 | Kurtz et al. | |
| 6,617,187 B1 | 9/2003 | Shimabukuro et al. | |
| 6,630,289 B1 | 10/2003 | Kwok et al. | |
| 6,665,119 B1 | 12/2003 | Kurtz et al. | |
| 6,686,980 B1 * | 2/2004 | Ichihashi | 349/96 |
| 2002/0167619 A1 * | 11/2002 | Bietsch et al. | 349/1 |

OTHER PUBLICATIONS

Larson, *A Survey of the Theory of Wire Grids,* IRE Trans MTT, 1962, pp. 191-201.
Auton and Hutley, *Grid Polarisers for Use in the Near Infrared,* Infrared Physics, 1972, vol. 12, pp. 95-100.
Auton, *Infrared Transmission Polarizers by Photolithography,* Applied Optics Jun. 1967, vol. 6, No. 6, pp. 1023-1027.

* cited by examiner

*Primary Examiner*—David Nelms
*Assistant Examiner*—Phu Vu
(74) *Attorney, Agent, or Firm*—Iandiorio Teska & Coleman (57) ABSTRACT

A small transparent display with a silicon active backplane on a transparent substrate, an array of pixel transparent electrodes on top of and controlled by the silicon active backplane, a transparent common plate, a liquid crystal material between alignment layers on the backplane and common plate, and a polarizer fabricated on the silicon active backplane. The polarizer corrects for depolarization of light passing through the transparent substrate and the silicon active backplane to improve the contrast of the display.

31 Claims, 6 Drawing Sheets

MICRODISPLAY

RELATED APPLICATIONS

This application claims priority to Provisional Application Ser. No. 60/610,677 filed Sep. 17, 2004.

FIELD OF THE INVENTION

This invention relates to a microdisplay with an integrated polarizer.

BACKGROUND OF THE INVENTION

A typical transparent liquid crystal display (LCD) includes a layer of liquid crystal material sandwiched between front and back transparent plates. The back plate includes transparent electrodes forming pixels on a transparent substrate such as glass. The front plate includes a transparent ITO electrode forming a common plate. The front and back transparent electrodes are coated with polyimide alignment layers. In active matrix displays, there is a silicon active backplane layer with electronic pixel addressing circuits on top of the transparent substrate of the back plate, and the transparent pixel electrodes are on top of and controlled by this silicon layer. In order for a liquid crystal display to function properly, the light incident on the liquid crystal material must be polarized. Thus, polarizers are typically used with LCD displays.

The applicants hereof have noted the advantages of using sapphire as the substrate for the silicon active backplane. Notably, sapphire is transparent and promotes the growth of single crystal silicon in which the electronic circuits are formed. See U.S. Pat. Nos. 6,190,933; 6,312,968; 6,365,936; 6,521,950, and 6,617,187, all of which are incorporated herein by this reference. Unfortunately, sapphire de-polarizes the light that also passes through the liquid crystal material.

The active matrix pixel addressing circuits can also depolarize the light, in which case the liquid crystal is prevented from controlling the light to obtain a high on/off contrast ratio. As this electrode circuitry is made smaller and smaller, as is the case with microdisplays, the depolarization effect is even greater.

A microdisplay is typically a tiny display measuring less than 1.5" diagonally that can be used with lenses to display the image of a full-size computer monitor or television. Microdisplays are used to create the image in such products as conference room projectors, rear-screen large format televisions, and camcorder viewfinders. Most microdisplays have electronic pixel addressing circuits fabricated as integrated circuits in a silicon layer. The active silicon layer is generally on a round substrate wafer that is typically made of silicon, glass, quartz, or sapphire. A number of complete microdisplay active backplanes are repeated over the surface of the wafer, which is ultimately cut up to make individual microdisplays.

Furthermore, the undesired depolarization effects of the transparent substrate and pixel addressing circuits tend to depend on the illumination incident angle, and this depolarization can be severe at certain angles. A microdisplay intrinsically has a large cone angle of light because the periodic small scale active matrix backplane structure diffracts light into a cone of off-axis diffraction order directions. In addition, obtaining high optical system throughput in microdisplay applications such as a projectors generally requires low f/# optical systems that transmit light having a large cone angle of transit directions through the microdisplay.

It is known to coat a polarizing material over one or both of the inner surfaces of a liquid crystal cell in order to protect the polarizers from mechanical damage and to eliminate the additional manufacturing step of attaching polarizers to a display. See U.S. Pat. Nos. 3,941,901, 6,630,289, and 6,399,166. In some instances, the polarizing material may also serve as the liquid crystal alignment layer.

It is also known to incorporate a wire grid polarizer behind the layer of liquid crystal material for passing light of one polarization orientation through the wire grid polarizer and reflecting light of another polarization orientation back through the layer of liquid crystal material to allow the display to operate either with ambient illumination or internal illumination. See U.S. Pat. No. 5,986,730 incorporated herein by this reference. It is also known to incorporate a wire grid polarizer behind the layer of liquid crystal material to act as an electrode, polarizer, and a mirror. See U.S. Pat. No. 4,688,897 also incorporated herein by this reference.

No prior art, however, teaches or suggests a technique for improving the contrast of a microdisplay incorporating a sapphire substrate.

SUMMARY OF THE INVENTION

It is therefore an object of this invention to provide a microdisplay with improved contrast.

It is a further object of this invention to provide such a microdisplay which incorporates a sapphire substrate.

The invention results from the realization that a liquid crystal display with improved contrast is achieved by the incorporation of a wire grid or other polarizer on the active silicon backplane to correct for the depolarization of light passing through the backplane sapphire substrate and also to correct for the depolarization of that light caused by the small closely spaced circuitry on the backplane.

The subject invention, however, in other embodiments, need not achieve all these objectives and the claims hereof should not be limited to structures or methods capable of achieving these objectives.

A transmissive display in accordance with the subject invention comprises an electrically-controlled polarization modulating material, an addressing backplane that changes the polarization of light and electrically controls the polarization modulating material, and an internal polarization isolator to isolate the desired polarization effects of the polarization modulating material from the undesired polarization effects of the addressing backplane. The addressing backplane often included a transparent substrate, such as sapphire. Sapphire is optically birefringent.

A typical polarization isolator is a linear polarizer interposed between the electrically-controlled polarization modulating material and the addressing backplane. The linear polarizer can be configured to absorb polarized light which it does not transmit. The polarization isolator may include an electrically-insulating linearly-polarizing material coated onto the electrically controlling side of the active backplane. One polarization isolator is a linear polarizer formed by patterning a one-dimensional wire grid array of closely-spaced metal lines on the electrically controlling side of the addressing backplane. The wire grid polarizer conducting layer can be patterned into transparent pixel electrodes, with an interconnection of the wire grid lines within a pixel, isolating gaps between pixels, and an electrical connection from each pixel to the addressing backplane. The conducting layer containing the wire grid polarizer can also be patterned with solid areas that serve to block light from passing from the polarization modulating material into specific regions of the active matrix integrated circuit. In some instances, it is desirable to coat the wire grid polarizer conducting layer with a silicon dioxide layer, which is then made flat and smooth by chemical mechanical polishing.

The addressing backplane may include a silicon layer containing an active-matrix integrated circuit. The polarization isolator may be a linear polarizer integrated as part of the active-matrix integrated circuit. This polarizer may be formed from a conducting layer in the integrated circuit which is patterned as a one-dimensional array of closely-spaced metal lines. As another alternative, the polarization isolator can be formed from a resistive conducting layer deposited on the on the electrically controlling side of the active backplane, and patterned as a one-dimensional array of closely-spaced lines to produce a wire grid polarizer which absorbs most of the polarized light which it does not transmit. Typically, the resistive conducting layer is made of polysilicon or nichrome.

The subject invention also features a polarization modulation isolator which isolates the desired polarization effects of a polarization modulating material from the undesired polarization effects of an addressing backplane in a transmissive display. The polarization isolator may be a linear polarizer interposed between the polarization modulating material and the addressing backplane. Alternatively, the polarization isolator can be a linear polarizer that absorbs the polarized light which it does not transmit, and is interposed between the electrically-controlled polarization modulating material and the addressing backplane. As another alternative, the polarization isolator can be an electrically-insulating linearly-polarizing material that is coated on the side of the addressing backplane that faces the modulating material. Still another polarization isolator is a linear polarizer formed by patterning a one-dimensional wire grid array of closely-spaced metal lines on the side of the addressing backplane that faces the modulating material. This wire grid polarizer conducting layer can be patterned into transparent pixel electrodes, with: interconnection of the wire grid lines within a pixel, isolating gaps between pixels, and an electrical connection from each pixel to the addressing backplane.

The subject invention also features a microdisplay comprising a polarization modulating material, a silicon layer containing an active-matrix integrated circuit for controlling the polarization modulating material, and a polarizer included in the integrated circuit. The integrated circuit, in one example, includes a conducting layer patterned as a one-dimensional array of closely-spaced metal lines to form a wire grid polarizer. The polarizer may be formed from a fabrication process where a conducting layer in the integrated circuit is patterned as a one-dimensional array of closely-spaced metal lines. The microdisplay may be configured as a transmissive microdisplay. The microdisplay may also be configured as a reflective microdisplay wherein light enters through the polarization modulating material, is reflected from the wire grid polarizer, and exits back through the modulating material. The silicon layer containing active-matrix integrated circuits can be on a single crystal silicon wafer. The integrated wire grid polarizer conducting layer may be patterned into transparent pixel electrodes, with an interconnection of the wire grid lines within a pixel, isolating gaps between pixels, and an electrical connection from each pixel to the active-matrix. The wire grid polarizer conducting layer is typically the top metal layer in the active-matrix integrated circuit. Alternatively, the top most conducting layer in the active-matrix integrated circuit may be coated with an electrically insulating polarizing material, where the top most conducting layer in the active-matrix integrated circuit can be an array of indium tin oxide transparent pixel electrodes.

The polarizer can be configured to absorb the polarized light which it does not transmit. This can be accomplished by coating the top most conducting layer in the active-matrix integrated circuit with an electrically insulating polarizing material which absorbs the polarized light which it does not transmit. Alternatively, an absorbing polarizer can be formed from a resistive conducting layer in the integrated circuit which is patterned as a one-dimensional array of closely-spaced lines to produce a wire grid polarizer which absorbs most of the polarized light which it does not transmit. The resistive conducting layer is typically made of polysilicon. The resistive conducting layer may be made of nichrome. The silicon layer is typically disposed on a transparent substrate such as sapphire.

The conducting layer containing the wire grid polarizer may also be patterned with solid areas that serve to block light from passing from the polarization modulating material into specific regions of the active matrix integrated circuit. The polarization modulating material can be a liquid crystal or other electro-optical material. The active matrix integrated circuit includes CMOS circuits with a transistor and a capacitor controlling each pixel.

The subject invention also features a method of fabricating a transparent display. Silicon is deposited on a sapphire substrate and active matrix pixel addressing circuits are fabricated in the silicon. An array of closely spaced metal conducting lines are patterned in the active matrix pixel addressing circuits to form a wire grid polarizer. An alignment layer is applied to the wire grid polarizer. Liquid crystal material is deposited adjacent the alignment layer. Preferably, patterning of the wire grid polarizer includes forming a conducting structure common to all the conducting lines within a pixel. The wire grid polarizer may be formed into transparent pixel electrodes by additionally removing the grid lines from the space between adjacent pixels and fabricating a via to electrically connect the wire grid to the active matrix pixel addressing circuits. The common conducting structure can be formed by sequentially exposing a negative photoresist to two patterns of light: one pattern of light with the conducting structure, and a second pattern of light with the wire grid lines. Alternatively, the conducting structure can be formed of small metallic islands in an integrated circuit interlayer dielectric below the wire grid conducting layer, such that each island spans at least two wire grid lines and the islands are positioned so that as a group they cause all the wire grid lines within a pixel to be electrically interconnected. One possible method for removing the grid lines from the space between adjacent pixels includes the steps of sequentially exposing a positive photoresist to two patterns of light, one pattern of light for where the grid lines are to be removed and one pattern of light for the spaces between the wire grid lines.

A transmissive microdisplay in accordance with the subject invention features a transparent substrate, a silicon addressing circuit on the transparent substrate including an array of pixel transparent electrodes on top of and controlled by the silicon active backplane, an alignment layer adjacent the addressing circuit, a transparent common plate, an alignment layer on the common plate, a liquid crystal material between alignment layers, and a polarizer on the silicon addressing circuit to correct for depolarization of light passing through the transparent substrate and the silicon active backplane to improve the contrast of the microdisplay. In some embodiments, the transparent substrate is sapphire.

The polarizer may be a layer coated over the backplane but preferably the polarizer is a one dimensional array of conductive lines patterned on the active silicon electrode backplane. The array of conductive lines typically have a pitch less than half the wavelength of visible light and the array is patterned to form an isolated island over every pixel. The lines over each pixel may be interconnected to form an electrode. In a preferred embodiment, the conducting lines are deposited on top of small metallic islands that each span between at least two lines and are positioned so that as a group they cause all the lines over one pixel to be interconnected to form an electrode. One or more of the metallic islands include a via that connects to the silicon active backplane. The metal used to form the conducting lines may include solid metal areas that block light from entering regions of the underlying silicon addressing circuit.

This subject invention features a transparent display comprising a polarization modulation material, an addressing circuit for controlling the polarizing modulation material, and a polarizer between the addressing circuit and the polarization modulating material. The polarizing modulation material may be a liquid crystal material, or other electro-optic crystal material. Typically, the addressing circuit is an active matrix pixel addressing integrated circuit including CMOS circuits fabricated in a silicon substrate with a transistor and a capacitor for each pixel of the substrate. In one preferred embodiment, the polarizer includes a one dimensional array of wires patterned as part of the active matrix integrated circuit, forming both a polarizer and the pixel electrodes. To form pixel electrodes, the array of wires is segmented between pixels and may be interconnected within each pixel by a common conducting structure or by underlying metallic vias spanning at least two wires. In another embodiment, the wire grid polarizer may be configured to suppress reflection. There may be an oxide layer between the pixel addressing circuits and the array of wires, and a transparent substrate adjacent to the other side of the addressing circuits. In one preferred embodiment, the transparent substrate is made of sapphire.

One preferred transparent display in accordance with the subject invention features a polarization modulation material, an addressing circuit for controlling the polarizing modulation material, and a wire grid polarizer between the addressing circuit and the polarization modulating material. The wire grid polarizer is segmented between pixels to eliminate the need for a separate transparent electrode, and the wires of the wire grid polarizer are interconnected.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
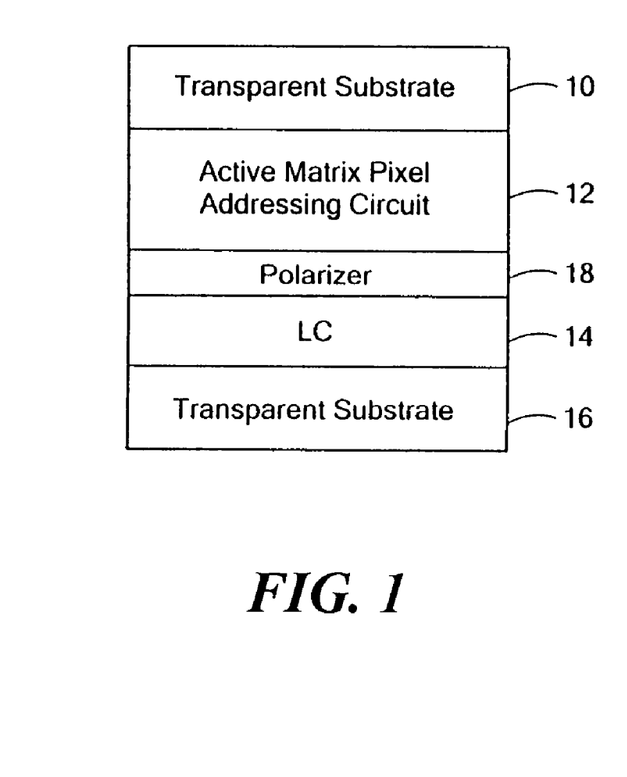
FIG. 1 is a highly schematic side view of a transparent polarization modulating microdisplay in accordance with the subject invention.

FIG. 1 shows transparent substrate 10, typically sapphire supporting active matrix pixel addressing circuit 12 which controls polarization modulating material 14, typically a liquid crystal, or other electro-optic material, between pixel addressing circuit 12 and transparent substrate 16, typically glass.

As explained in the background section above, the use of sapphire as the material supporting the silicon active matrix pixel addressing circuitry is advantageous because it is transparent and promotes the growth of single crystal silicon in which the addressing circuits are formed.

But, the sapphire material also disadvantageously de-polarizes the light entering or exiting liquid crystal material 14. In addition, the active matrix pixel addressing circuit 12 itself can depolarize light incident on liquid crystal material 14. As the pixels are made smaller, a larger fraction of the light is reflected from the circuits and may be depolarized.

Thus in the subject invention, a polarizer 18 is typically integrated on the addressing circuitry 12 in order to isolate the undesired backplane polarization effects of the addressing circuitry 12 and the sapphire substrate 10 from the desired polarization modulation of the liquid crystal 14.

Figure 2:
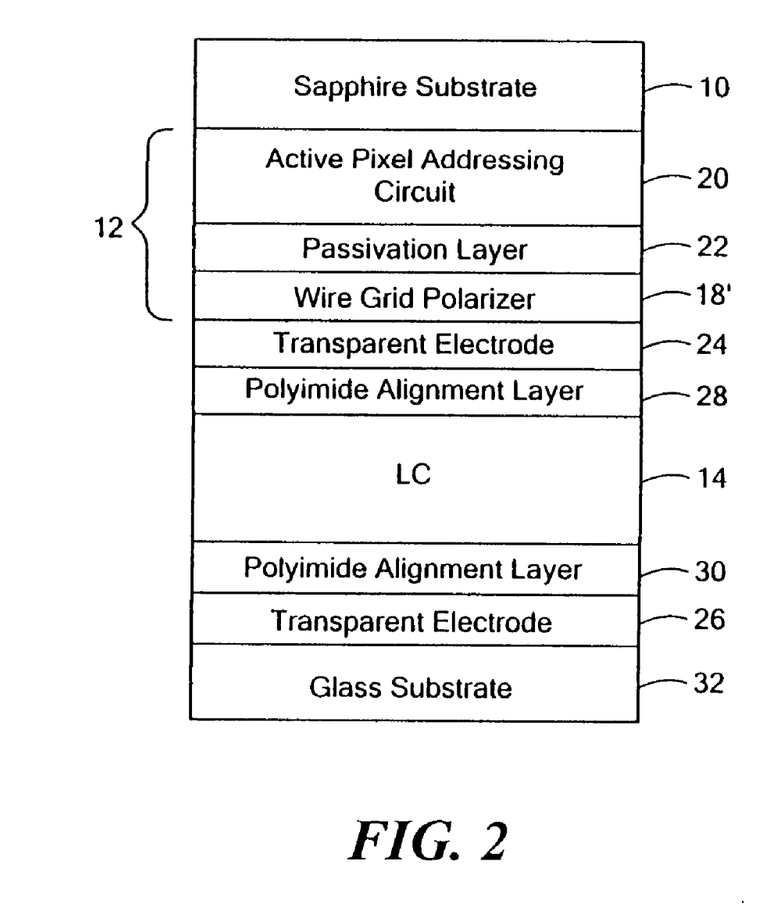
FIG. 2 is another highly schematic side view of a more complete example of a trasmissive display in accordance with the subject invention.

If polarizer 18 is a wire grid polarizer as is preferred, the polarizer is actually integrated with the active matrix pixel addressing circuitry as shown in FIG. 2, wherein the circuitry in silicon is shown at 20 and the wire grid polarizer 18' is patterned on an interlayer dielectric 22 disposed over the circuitry. Typically CMOS circuits including a transistor and a capacitor for each pixel of the substrate.

FIG. 2 also shows the additional elements of a typical display including transparent electrodes 24 and 26, polyimide alignment layers 28 and 30, and glass substrate 32 known to those skilled in the art. Electrical drive signals cause the active-matrix pixel-addressing circuits 20 to place a voltage on the transparent pixel electrode 24 associated with each pixel. This voltage creates an electric field between the transparent pixel electrodes and the uniform transparent common plate electrode 26. This electric field causes the electrically-controlled modulating layer 14 to change the polarization of illumination passing through each pixel. External polarizers change this polarization into a viewable image, where the intensity at each point in the image is a function of the polarization modulation of the corresponding pixel in the microdisplay. The polarizers external to the microdisplay can have different polarization axes, depending on the characteristics of the specific electrically-controlled modulating layer that is used.

Illumination can be applied from either the left or the right in FIG. 2. When uniform illumination is applied from the left, the illumination exiting to the right is modulated by the image in the microdisplay pixels. Similarly, when uniform illumination is applied from the right, the illumination exiting to the left is modulated by the image in the microdisplay pixels.

Sapphire substrate 10 has undesirable polarization modulation characteristics, due to its birefringence, which causes undesired changes in the polarization passing through the microdisplay, and corrupts (or "depolarizes") the desired polarization changes imposed by the electrically-controlled modulating layer 14.

Active-matrix pixel addressing circuits 20 can also cause undesirable changes in the polarization of the light passing through the microdisplay. These undesired polarization effects are due to light being reflected, scattered, and diffracted as it passes through the active-matrix pixel addressing circuits. These effects become more pronounced as the pixels become smaller, and hence this polarization corruption (or "depolarization") is a serious problem in the very small pixels of a microdisplay.

In one specific embodiment (See U.S. Pat. Nos. 6,190,933; 6,312,968; 6,365,936; 6,521,950; and 6,617,187), substrate 10 is a single sapphire crystal whose atoms are spaced by about the same distance as the atoms in a silicon crystal lattice. This allows very high quality single crystal silicon to be grown on the sapphire. The active matrix backplane circuits 20 are CMOS circuits that are built in single crystal silicon which is grown directly on the sapphire substrate.

Alignment layers 28 and 30 orient the liquid crystal at each surface so that the liquid crystal responds properly to an applied electric field to impose the desired polarization modulation on light passing through the liquid crystal material.

Polarizing materials or polarizing wire grids serve to interpose a polarizer between the liquid crystal and the addressing circuits to remove the depolarization effects of the sapphire and microdisplay pixel structure, and thereby allows the liquid crystal to control the light to obtain a high on/off contrast ratio.

The pixel address circuits 12 in a transparent microdisplay control a transparent electrode 24 that applies control voltages to the liquid crystal cell. The most common transparent electrode material is an Indium Tin Oxide (ITO) electrode. ITO electrodes add complexity and expense to the manufacturing process, since ITO deposition, patterning, and etching is not a standard process in integrated circuit manufacturing. The ITO electrodes are typically connected to the pixel addressing circuits by tungsten vias. Aluminum vias cannot be used because aluminum reacts with ITO to degrade the ITO. In addition there is light loss in the ITO layer which reduces the optical transmissivity of a microdisplay.

Wire grid polarizer 18' can also serve as the transparent electrode over the active matrix. This simplifies backplane manufacture by eliminating the non-standard ITO transparent electrode fabrication process. When wire grid polarizer 18' is used for the transparent pixel electrodes, it is patterned as an intrinsic part of the backplane manufacturing process into isolated islands over each pixel, and additional metal structure is added to electrically interconnect all the wires in a pixel.

Using the wire grid polarizer 18' as the transparent electrode increase optical throughput of the microdisplay. When wire grid polarizer 18' also serves as the transparent electrode, light loss in the ITO layer is eliminated. Wire grid polarizer 18' does not generally add additional light loss, since it eliminates an external polarizer that the ITO system would require. Wire grid polarizer 18' can be a very efficient polarizer, passing over 45% of randomly polarized input light.

The preferred wire-grid polarizer is integrated as an intrinsic part of the silicon active backplane pixels and can be incorporated as part of a standard CMOS fabrication process at a number of foundries. Typical wire grid polarizer pitches are less ½ wavelength (<0.25 um). After an oxide layer 22 is deposited over the backplane circuits and made smooth by chemical mechanical polishing (CMP), the wire-grid metal layer is deposited and patterned. This same metalization layer could be patterned with a black-matrix between pixels and a light shield over the active matrix circuits, in addition to the wire-grid polarizer on top of pixels. In addition, the wire grid polarizer could serve as a transparent electrode, and thereby eliminate the need for tungsten vias and ITO electrodes 24 as noted above. Each pixel can be connected by an ordinary aluminum contact-via to a metal edge or frame connecting all the wires in that pixel's wire-grid.

Since the wire-grid is at an extremely fine pitch, the liquid crystal in a pixel is subject to a uniform potential. The wire grid polarizer may possibly aid LC alignment to an overlying polyimide layer. However, if the wire grid polarizer metal topology (<0.15 um thickness) interferes with LC alignment, a thin oxide can be deposited over the wire grid polarizer and made flat by a CMP process. In many instances a CMP oxide layer is not required because the polyimide layer itself tends to fill in between the grid lines and significantly smooths the wire grid structure.

Wire grid polarizer 18' significantly improves the contrast of a transparent microdisplay built on sapphire substrate 10. When illuminated from the sapphire side, the input illumination is depolarized by sapphire substrate 10 and by active matrix 20 but is then linearly polarized by wire grid polarizer 18' just before it enters liquid crystal 14. The light then exits through glass substrate 32 and passes through an optical second polarizer (not shown) to produce a high contrast intensity image. In the prior art, which did not use a wire grid polarizer, linearly polarized input illumination is no longer purely linearly polarized when it arrives at the liquid crystal and the liquid crystal cannot modulate it to produce a high contrast image after passage through the second polarizer.

In the prior art which did not use a wire grid polarizer, the microdisplay illumination must enter the sapphire side and be linearly polarized along a sapphire birefringent axis, so that the birefringence does not change the polarization of collimated input illumination. If the input polarizer was rotated by more than a few degrees from the sapphire axis, the sapphire birefringence produced enough elliptical polarization to reduce the image contrast below 1000:1. Maintaining this tolerance in a mass manufactured product could be difficult. The wire grid polarizer 18' removes this constraint on the polarization of the input illumination, and therefore makes it much easier to manufacture products incorporating a transparent microdisplay on a sapphire substrate.

Wire grid polarizer 18' also makes it much easier to manufacture a transparent microdisplay on sapphire by eliminating the requirement for tight alignment between the sapphire birefringent axes and the liquid crystal alignment axis. The microdisplay must be fabricated with the liquid crystal alignment layer also oriented along a sapphire birefringent axis, so that this input illumination is correctly polarized to obtain maximum contrast from the liquid crystal. A misalignment of few degrees between the alignment layer and the sapphire birefringent axis can significantly reduce the image contrast. In practice this precise alignment is very difficult to achieve. For example, circular sapphire wafers have an orientation flat cut on one side that indicates the direction of the birefringent axes, and this flat generally has a ±2° tolerance or worse.

Wire grid polarizer 18' improves image contrast in applications with low f/# optics, such as projectors. In the prior art which did not use a wire grid polarizer, the microdisplay was preferably illuminated from the sapphire side with linearly polarized light aligned along one of the sapphire birefringent axes. However, when this input illumination is not highly collimated, but instead enters the sapphire from a diversity of angles, the polarization of the angular rays no longer precisely aligns with a birefringent axis. The liquid crystal then sees elliptically polarized input light which results in reduced image contrast. The wire grid polarizer of this invention intercepts this elliptically polarized light and restores it to linear polarized light before entering the liquid crystal.

Wire grid polarizer 18' also makes it possible to obtain high contrast when the display is illuminated from the side of glass substrate 32. In prior art which did not use a wire grid polarizer, the microdisplay is preferably illuminated from the sapphire side with linearly polarized light aligned along one of the sapphire birefringent axes. When illuminated from the glass side, the input linearly polarized light is changed by the liquid crystal layer into elliptically polarized light before entering the sapphire, and therefore cannot be oriented exclusively along one sapphire axis. The sapphire birefringence then greatly changes the polarization from the liquid crystal and reduces contrast. The wire grid polarizer of this invention converts the light leaving the liquid crystal into an intensity image, and then any additional polarization effects of the sapphire and active matrix no longer reduce image contrast.

One may desire to illuminate the display from the glass side for a number of reasons, including: shielding the backplane circuits from intense illumination, left-right mirroring of the image to correct for a mirror inverting optical system, or getting the liquid crystal layer closer to an external illumination optical system.

By enabling high contrast when the microdisplay is illuminated from the glass side, wire grid polarizer 18' makes it possible to more effectively shield the electrical circuits in the back plane from performance degrading electrical currents induced by intense illumination. Silicon layer 20 is directly deposited on the sapphire. The side of the silicon away from the sapphire is coated with metal traces during the circuit fabrication process. When illuminated from the sapphire side, there is nothing to block light from reaching the light sensitive silicon. However, when illuminated from the glass side, the metal layers can efficiently shield the silicon circuits from light.

The ability to operate with intense illumination is particularly important in projector applications, because projectors typically apply very intense illumination to the microdisplay in order to get adequate brightness in the projected image. Allowing higher brightness on the microdisplay also makes it possible obtain adequate image brightness in lower-cost, time-sequential-color projector designs, where all the colored light goes through one microdisplay. For a given luminous flux in the projected image, a one microdisplay projector puts about three times more light through the microdisplay than a three display projector, where each display is dedicated to a different color (i.e., red, green, and blue). In addition, the ability of the microdisplay to handle higher brightness also makes it possible to put all the light through smaller sized microdisplays, which tend to cost significantly less.

By enabling high contrast when the microdisplay is illuminated from the glass side, wire grid polarizer 18' facilitates the use of a microlens array (MLA) to improve performance of the microdisplay. To be effective, the light must enter through the MLA. The MLA must often be placed on the glass side of the microdisplay where a thin glass substrate 32 can be used, in order to position the MLA close enough to the active circuits to be effective. Furthermore, the MLA is often incorporated directly in the cover glass, and is impractical to fabricate in the sapphire substrate.

In the MLA, a small lens is placed over each pixel to intercept input light entering a larger fraction of the pixel area and focus the light through the pixel without hitting the active matrix circuits. This results in a higher light transmission through the microdisplay. This also reduces the light that hits the circuits and allows higher illumination levels to be used without degrading the circuit operation.

Additional black matrix structures can be patterned in the same metalization layer as wire grid polarizer 18'. These light blocking structures can serve functions such as: a) shielding the electrical circuits in the active matrix from the performance degrading effects of intense illumination, b) blocking light from passing through the space between pixels where the liquid crystal may not be modulated with the correct voltage, and c) shaping the overall pixel aperture.

Wire grid polarizer 18' also simplifies the application of the microdisplay to products by eliminating an external polarizer. This reduces cost and complexity in product applications of the microdisplay. In some applications, a plastic polarizer is adhered to the microdisplay, and the adhesion process can harm image quality. In addition plastic polarizers often have a large number of pinhole and particle defects, which harm image quality. Furthermore, this internal polarizer is also protected from scratches, dust, and other degradation.

Wire grid polarizer 18' can form part of a system to recover polarized light that would otherwise be lost. The wire grid reflects most of the light that is orthogonally polarized to the light that it passes. When the microdisplay is illuminated from the sapphire substrate side, some of this reflected light passes back through the sapphire and is reflected by the sapphire-air interface and other external optical surfaces to reenter the microdisplay through the sapphire. The two passes through the sapphire birefringence can change the polarization orientation or ellipticity of this light, so some of it can now pass through the wire grid polarizer. Since the thickness of the sapphire is not precisely known, a superior approach is to minimize the sapphire effect by aligning the input light along a sapphire birefringent axis, and then coating a quarter wave retarder layer directly under the wire grid or as a separate external component before light enters the sapphire substrate.

As a reflective polarizer, wire grid polarizer 18' will not be excessively heated by absorbing intense illumination. This is particularly important in high lumen projection applications.

As mentioned above, a wire grid polarizer tends to reflect the light that it does not transmit. In some applications, reflection from the wire grid polarizer is not desirable. The reflected light can follow paths that reflect off other surfaces to reduce contrast and create ghost images. For this reason, a reflective polarizer is almost never used on the light exit side of a microdisplay in an image projector. More specifically, if the light enters through the glass substrate 32 and then passes through the liquid crystal 14 before passing through the wire grid polarizer 18, the wire grid polarizer can reflect light back through the liquid crystal toward the source, and this light can be re-reflected from various surfaces to come back through the wire grid.

It is therefore sometimes desirable to design the internal polarizer to absorb, rather than reflect the polarization that it does not transmit. This can be accomplished by making the wire grid lines from a poor conductor. Light polarized along the grid lines then induces currents, which are dissipated in the resistance of the wire grid rather than causing emission of reflected light. Light polarized perpendicular to the grid lines passes through the polarizer without losses. A resistive wire grid can be made from such materials as nichrome or polysilicon. Polysilicon has the advantage of being compatible with the fabrication process of the backplane transistors.

Another possibility is to coat the active matrix substrate with a non-metallic polarizing material that absorbs, instead of reflecting, the polarized light that is not transmitted. An example of suitable coatable absorbing polarizer material is discussed in U.S. Pat. Nos. 6,399,166, and 3,941,901.

The subject invention is thus a solution to many problems more specific to transparent microdisplays. For example, the prior art teaches using a wire grid polarizer as an efficient transmissive reflector in a transflective display. A transflective display can be used either with ambient reflected light or with a transmitted backlight. The prior art also teaches increasing the performance of a reflective display by placing a wire-grid polarizer between the light that has passed through the liquid crystal and the light that is reflected back out.

In distinction, the current invention solves problems specific to a transmissive microdisplay. One issue addressed by this patent is depolarization by the small scale structures in the transmissive active matrix backplane. Another issue is removing depolarization caused by birefringence in the transparent substrate, such as sapphire, used in a transparent microdisplay. By addressing these issues, wire grid polarizer 18' significantly increases the contrast of a transparent microdisplay. These contrast reducing depolarization effects can become more severe for light passing through the display at non-normal angles to the display surface. This is the case in a typical projector application, where low f/# optics are generally used. For example, with f/2 optics, the sapphire substrate can reduce the contrast below 250:1. This invention can therefore be critical to the use of transmissive microdisplays in projector applications.

Figure 3:
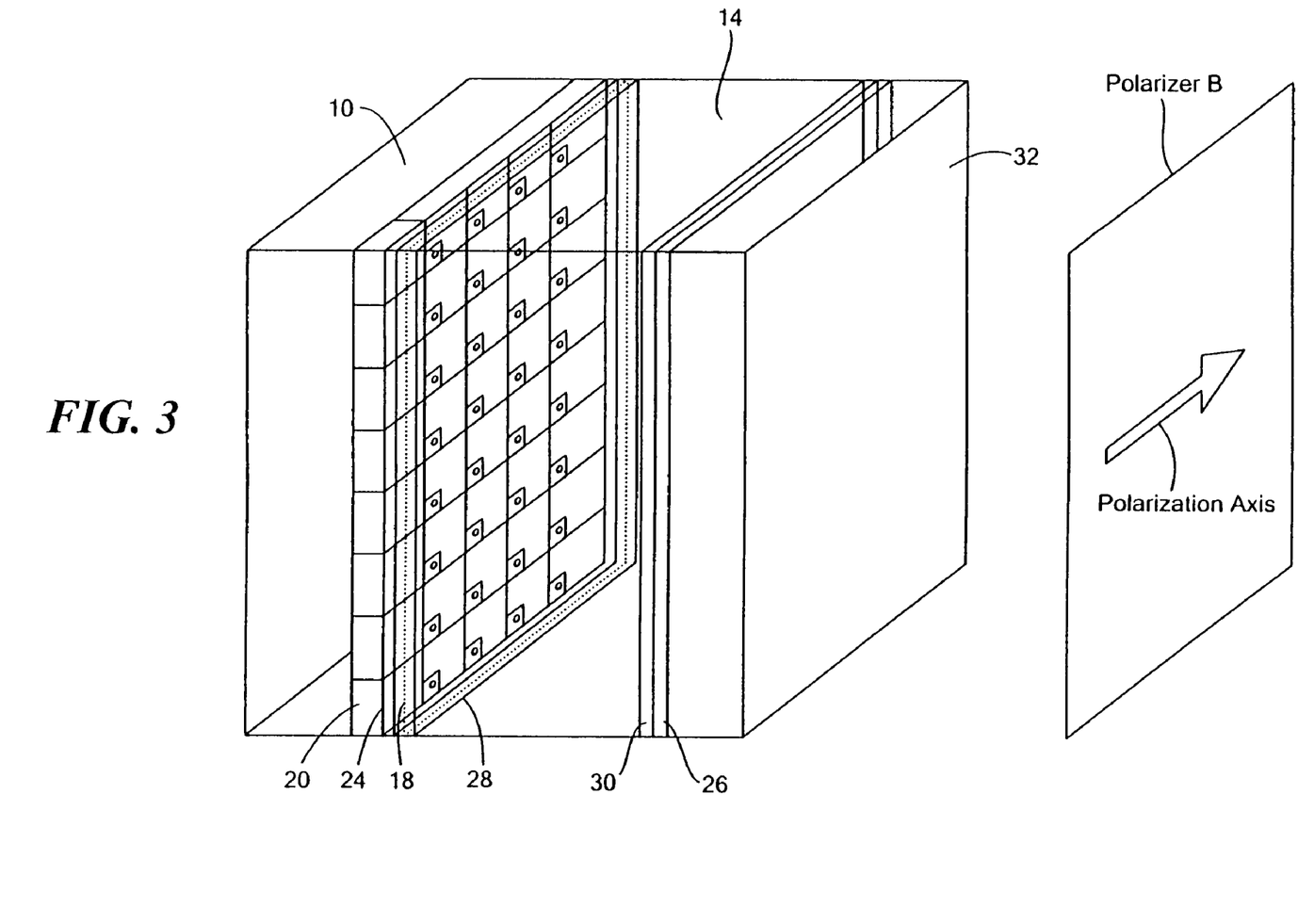
FIG. 3 is a schematic three-dimensional view of a microdisplay in accordance with the subject invention incorporating a polarizer.

As shown in FIG. 3, a polarizing layer 18 is incorporated between the active-matrix pixel addressing circuits 20 and the electrically-controlled phase modulating material 14. One possible location for this polarizing layer 18 is between transparent pixel electrodes 24 and alignment layer 28. This is a desirable location for an electrically insulating polarizing layer. In this location, polarizing layer 18 will not block the electrical contact between the addressing circuits and the transparent pixel electrodes. One disadvantage of this location is that some of the voltage between the transparent pixel electrodes and the transparent common plate electrode is dropped in the polarizing layer. This could necessitate that undesirable higher supply voltages be used to drive the microdisplay.

One solution is to place the polarizing layer between addressing circuits 20 and transparent pixel electrodes 24. This configuration requires a more complex manufacturing process where conducting vias between the addressing circuits and transparent pixel electrodes are fabricated through holes formed in the polarizing layer.

Figure 4:
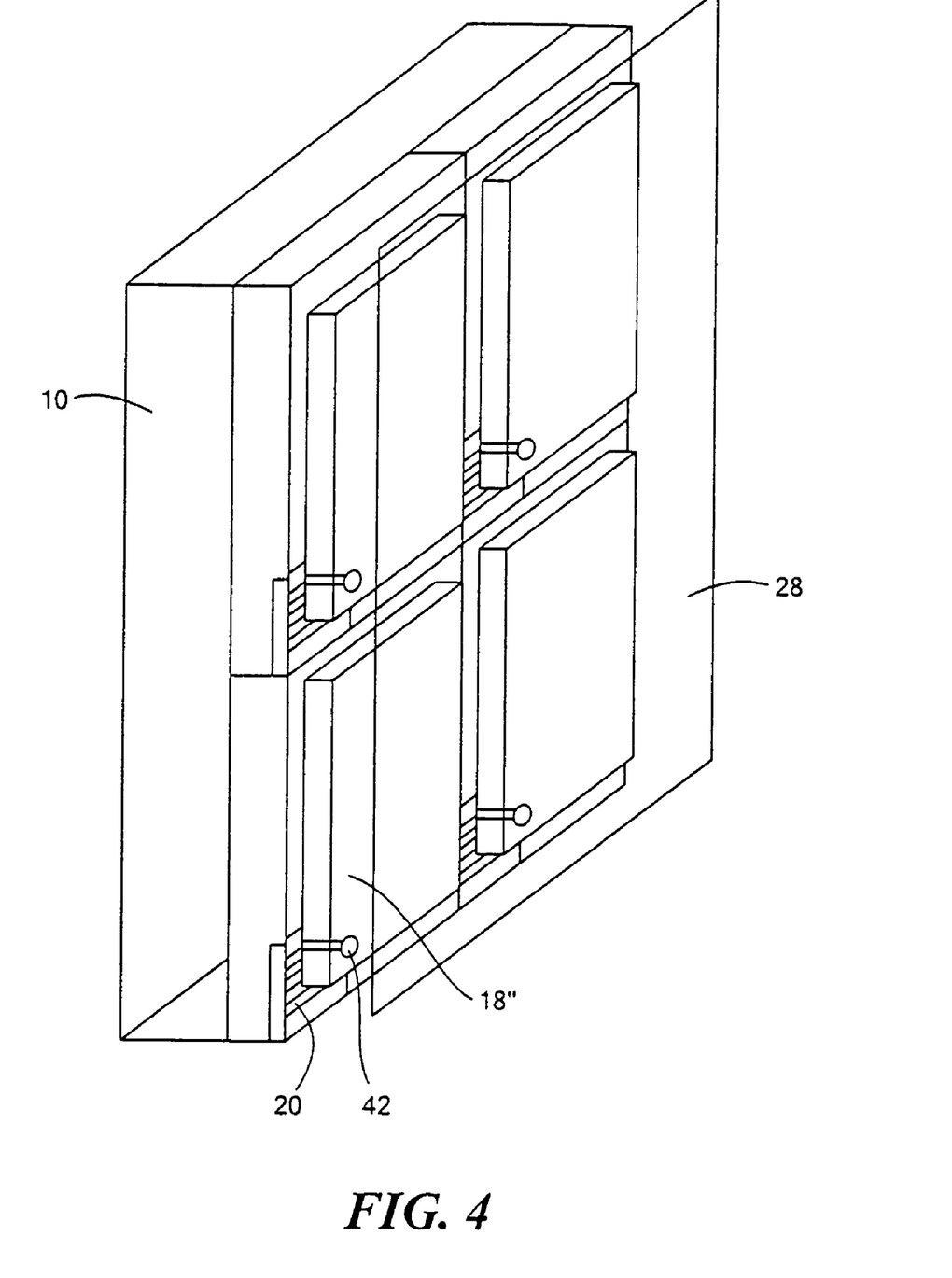
FIG. 4 is a schematic three-dimensional view of a microdisplay backplane in accordance with the subject invention incorporating a conducting polarizing layer.
Figure 5:
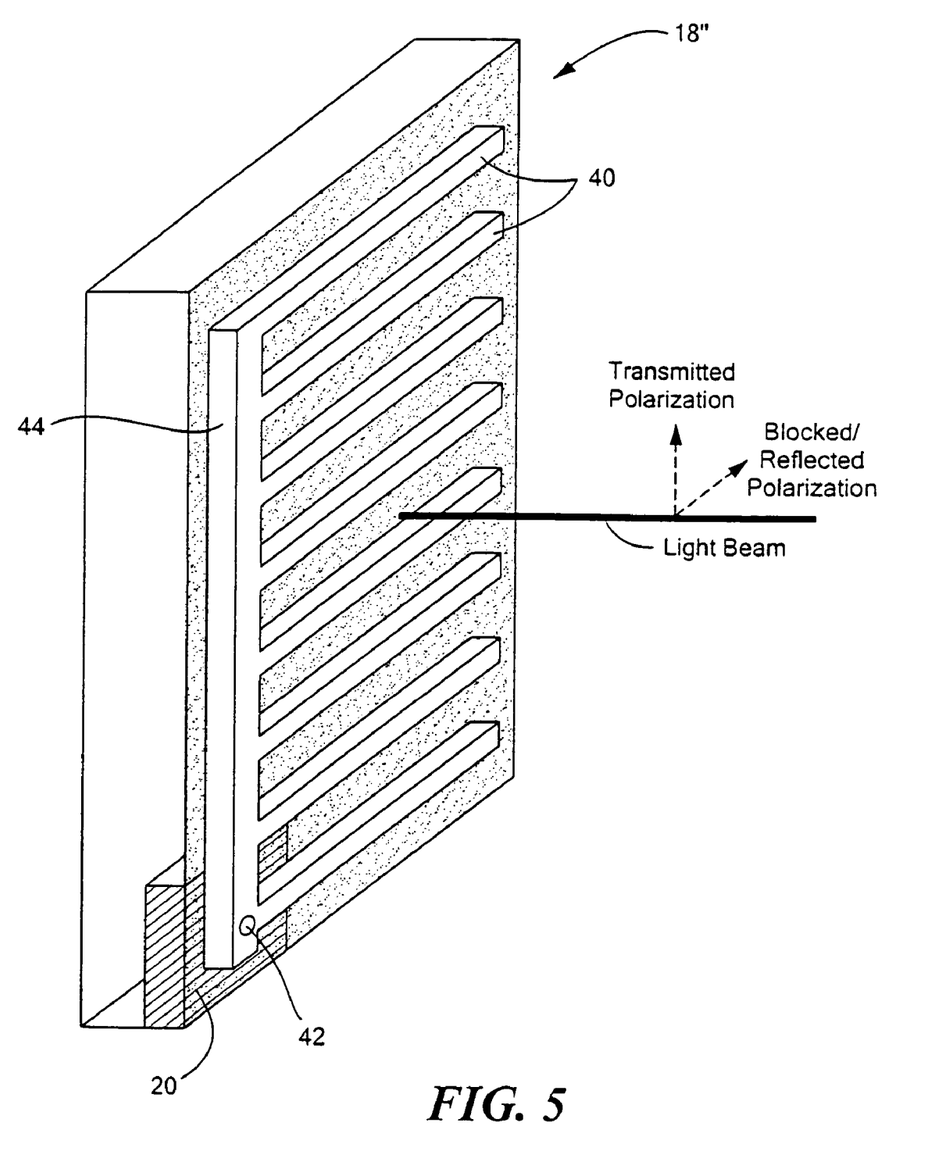
FIG. 5 is a schematic three-dimensional view showing a microdisplay pixel with an example of a wire grid polarizer in accordance with the subject invention.

Another embodiment is to use conducting polarizing layer 18", as shown in FIG. 4. This has the advantage of merging the transparent pixel electrodes and polarizing layer into a single layer. Very good polarization characteristics can be obtained by using an array of one-dimensional closely spaced conductors 40 as shown in FIG. 5. When the pitch from wire to wire is less than ½ wavelength (<0.25 um), light with its electric vector polarized along the grid wires induces electric currents in the grid wires that cause the light to be reflected and absorbed. A wire pitch of <0.15 μm is preferable for good performance in blue light. Very little light passes through the wire grid. On the other hand, over 90% of light with its electric vector polarized perpendicular to the wires passes through the wire grid. As fabrication techniques for making small structures have improved, wire grids have been scaled down to polarize infrared and visible light. See, for example: Larson, "A Survey of the Theory of Wire Grids", FRE Trans MTT, 1962, pp. 191-201; Auton and Hutley, "Grid Polarizers for Use in the Near Infrared," Infrared Physics, 1972, vol. 12, pp. 95-100; Auton, "Infrared Transmission Polarizers by Photolithography," Applied Optics June 1967, vol. 6, No. 6, pp. 1023-1027, and U.S. Pat. Nos. 0,224,224 and 3,426,143. In more recent years, a number of improvements have been made in wire grid fabrication techniques and performance, see for example U.S. Pat. Nos. 6,122,103; 6,243,199; 6,288, 840; 6,452,724; 6,532,111; and 6,665,119.

Figure 6:
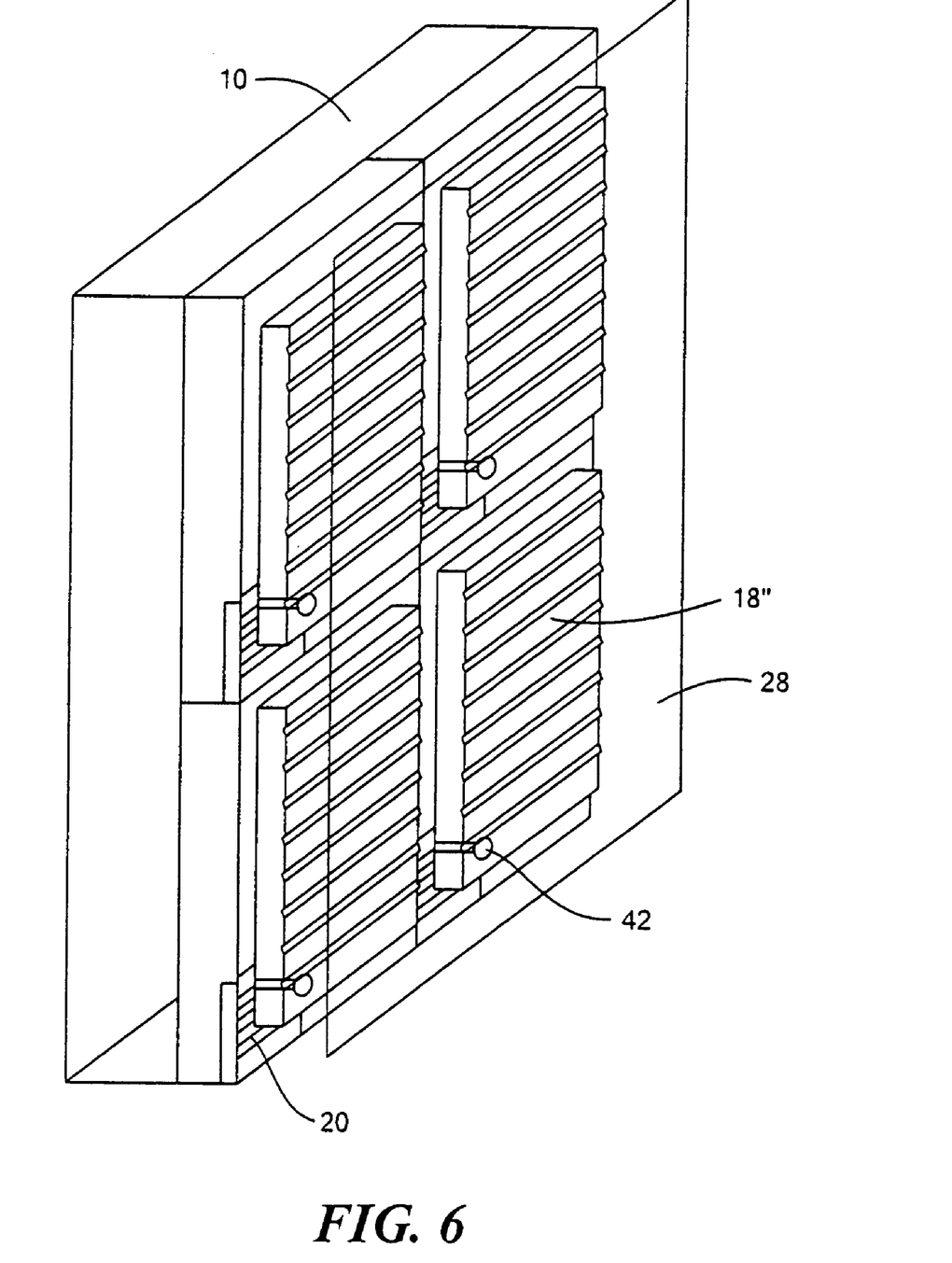
FIG. 6 is another schematic three-dimensional view of a microdisplay backplane incorporating a wire-grid polarizer in accordance with the subject invention.

In order to do double duty as the transparent pixel electrode and polarizer, wire grid polarizer 18", in FIGS. 4-6 is cut between pixels to electrically isolate each pixel. The pixel addressing circuit in each pixel is electrically connected by a contact 42 to a frame, perpendicular wire, or other conducting structure, 44, in FIG. 5, that electrically interconnects all the wires over a pixel. Since the wire-grid is at an extremely fine pitch, the liquid crystal in a pixel sees a uniform potential.

This discussion has been directed toward transmissive microdisplays. However, the integrated wire grid pixel electrode structure shown in FIG. 5 could also be integrated into a reflective microdisplay. Since a wire grid polarizer reflects the light that it does not transmit, the wire grid becomes a polarizing mirror in a reflective microdisplay.

A reflective microdisplay often requires a polarizing beamsplitter, since the input beam is typically polarized in one orientation and the output beam must be passed though an orthogonal polarizer. This integrated polarizer allows the polarizing beamsplitter to be eliminated. In operation, incident light passes through an external polarizer, then through the liquid crystal, then reflects from the wire grid which is oriented to reflect only polarization orthogonal to the input polarization, then passes back through the liquid crystal, and then passes back through the same external polarizer. This configuration could also potentially increase the contrast of a reflecting microdisplay by, in effect, putting in series two liquid crystal cells between polarizers. One possible system configuration is to mount a polarizer on the surface of a reflective microdisplay and to illuminate the microdisplay with a slightly off-axis incident beam, so that the modulated reflected beam path is also off axis.

The basic wire grid structure and fabrication process for a reflective or a transmissive microdisplay is essentially the same. A wire grid could be integrated, for example, in the top metal layer of the pixel addressing integrated circuits. With light incident from the liquid crystal side, one polarization exiting the liquid crystal will be transmitted though the microdisplay backplane; orthogonally polarized light will be reflected back out through the liquid crystal. When the substrate is opaque silicon, this becomes a reflective liquid crystal on silicon (LCOS) microdisplay. For a reflective microdisplay, performance could be improved by integrating an additional light absorbing layer under the wire grid layer, in order to suppress reflections from the active matrix circuits back though the wire grid polarizer layer.

Figure 7:
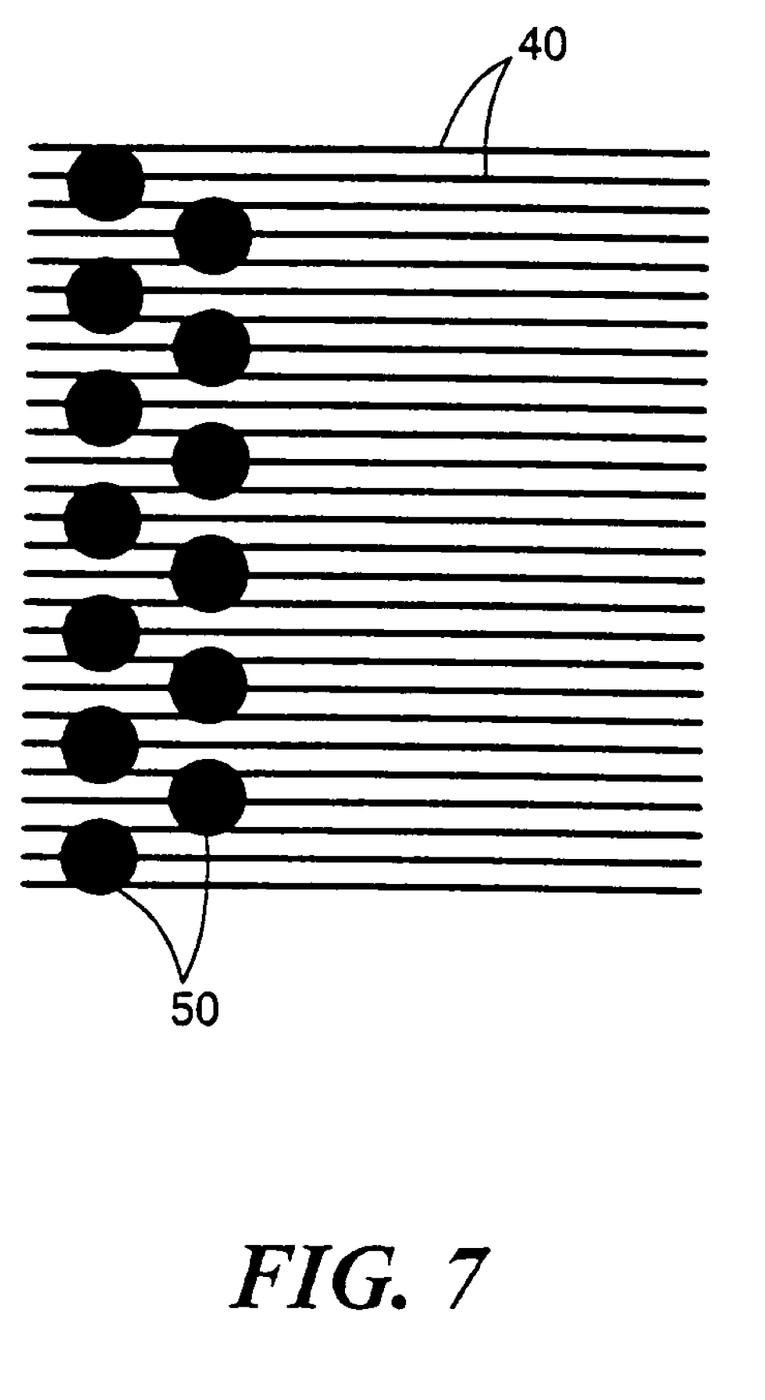
FIG. 7 is a schematic top view of a microdisplay pixel in accordance the subject invention where vias are used to interconnect the lines of a wire grid transparent electrode.

A preferred method for interconnecting the grid lines is shown in FIG. 7 wherein vias 50 from the underlying pixel circuit form of a staggered array of vias. Each via has the size to span at least 2 wire grid lines. These vias then short adjacent lines and cause all the lines within a pixel to be shorted to each other. In practice, only one via need contact the underlying pixel circuit. The remainder of the vias can be very shallow, since their only function is to interconnect wire grid lines. These vias are normally created as tungsten plugs which are polished to be level with the surrounding oxide. This has the significant benefit of producing a very flat surface for the wire grid to be deposited on.

The basic manufacturing steps to make a transparent microdisplay are listed below. Most of the routine lowest level steps, such as cleaning, applying photoresists, exposing to mask patterns, etching, and the like are omitted.

First, single crystal silicon is deposited on the sapphire substrate 10, in FIG. 2 and recrystalized and annealed to improve it as described in U.S. Pat. Nos. 6,190,933; 6,312, 968; 6,365,936; 6,521,950; and 6,617,187. CMOS active-matrix pixel addressing circuits 20 are then fabricated at a standard silicon foundry. The top-most silicon dioxide passivation layer 22 is smoothed by a chemical-mechanical polish (CMP) process. The tungsten via connections are then made that will go between pixel addressing circuits 20 and transparent electrodes 24. The via openings are etched, a liner metal is deposited, the tungsten is deposited, and tungsten outside the via plugs is polished off.

There are other options, such as using conventional aluminum vias. Aluminum reacts with ITO and therefore may not be used if ITO is used to make the transparent electrodes. Other modifications may also be desirable, such as modifying the vias to also interconnect the wire grids lines within a pixel, as described below.

The combined wire grid polarizer 18' and transparent electrode 24 is then formed as the top metal layer in the integrated circuit fabrication process by patterning an array of closely spaced metal conducting lines on the flat CMP oxide layer, where the wire lines in the array are electrically interconnected over each pixel, connected to the via from the underlying pixel circuit, and electrically isolated between pixels as illustrated by 18" in FIG. 5. These lines have a pitch of less than 0.25 um and a width on the order of half of that.

A few possible methods for fabricating the integrated, combined wire grid polarizer and transparent electrode 18" will be described in more detail. Aluminum can be uniformly deposited over the surface of the silicon wafer containing the flat silicon backplane circuits, covered with photoresist, and exposed to a pattern of closely spaced metal lines. This line pattern can be created by a high-resolution UV phase-shift mask aligner or by exposure to two interfering laser beams. The mask pattern may also include isolation between pixels, and a perpendicular line as shown at 44 in FIG. 5 or a frame to interconnect the lines within a pixel. The undesired photoresist is etched away, aluminum not covered by photoresist is etched away, and residual photoresist is removed.

In one variation of the fabrication process, the wire grid transparent electrodes can be created in two or more steps. This is particularly useful, when a high-resolution mask aligner, capable of printing less than 0.15 um line width, is not available. First, a continuous array of one-dimensional metal conducting lines are created over the whole wafer surface. The high-resolution photo pattern for this could be created by interfering two laser beams, by direct writing on the wafer with a laser or e-beam, or by a conventional high resolution mask aligner. Second, a low-resolution photomask is used to pattern the wire grid into an isolated island over each pixel. Next, a shorting bar 42, in FIG. 5, frame, or other metal structure is formed to interconnect the grid lines within a pixel.

It is desirable to use a method for fabricating the shorting bar 44 that does not produce height variations in the combined wire grid polarizer and pixel electrode structure 18". Such height variations could interfere with the liquid crystal alignment layer and fill processes. This generally precludes fabrication methods where the shorting bar 44 is fabricated beneath or on top of the grid lines 40.

One preferred method for fabricating the combined wire grid polarizer and pixel electrode structure 18" is to successively expose a negative photoresist layer to two patterns: the wire grid pattern and the shorting bar pattern. The negative photoresist is then removed from unexposed regions, and remains in the exposed regions. The aluminum is then etched from regions with no photoresist, leaving behind the combined wire grid 40 and shorting bar 44 patterns in FIG. 5. The wire grid isolation between pixels can then be created by a second application of photoresist, exposure to a mask with isolated pixel islands, and etch of aluminum not covered by photoresist.

Another preferred method for interconnecting the grid lines in shown in FIG. 7, wherein vias 50 from the underlying pixel circuit form a staggered array of vias. Each via has the size to span at least two wire grid lines. These vias are normally created as tungsten plugs which are polished to be level with the surrounding oxide. The wire grid is patterned on top of the oxide containing these via openings. The vias then short adjacent lines and thereby cause all the lines within a pixel to be shorted to each other. In practice, only one via need contact the underlying pixel circuit. The remainder of the vias can be very shallow, since their function is only to interconnect wire grid lines.

The wire grid isolation between pixels can then be created by a second application of photoresist, exposure to a mask with isolated pixel islands, and etch of aluminum not covered by photoresist. Alternatively, a single positive photoresist could be used with two exposures: the wire grid pattern and interpixel isolation pattern. The positive photoresist is removed from exposed regions. Then an aluminum etch would simultaneously create the wire grid and remove aluminum from the regions between pixels.

If the wire grid structure has height variations that interfere with the liquid crystal alignment layer and fill processes, an additional oxide layer can be applied over the grid and smoothed by a CMP process. However, some of the applied voltage will be dropped across this insulating layer. If the voltage drop is too large, an ITO transparent electrode layer could be coated over the insulating layer. This structure thus divides the wire grid polarizer 18 and transparent pixel electrodes 24 into two distinct layers. One fabrication process for this structure is: create a uniform wire grid polarizer over whole wafer, etch a hole in the wire grid at each pixel to allow a via from the back plane to pass through, deposit silicon oxide, smooth with CMP, open via holes down to the active matrix, fill the via holes with tungsten, remove excess tungsten with CMP, deposit ITO over the silicon oxide, and pattern ITO into an isolated island over each pixel.

The next manufacturing steps to make a microdisplay involve liquid crystal processing. A thin polyimide layer, 28 in FIG. 2, is applied to the surface of the transparent pixel electrodes 24 uniformly over whole wafer. The polyimide layer is rubbed so that it can align the liquid crystal molecules for the desired operating mode. A polyimide layer 30 is also applied uniformly over the surface of a uniform ITO transparent common plate electrode 26 deposited on one side of transparent cover glass wafer 32. This polyimide layer is also rubbed so that it can align the liquid crystal molecules for desired operating mode. A spacer sealing gasket (not shown) is applied around outside of pixel array on each display die on a wafer. The cover glass wafer 32 containing the rubbed polyimide layer 30 and the ITO transparent electrode 30 on its inner surface is then attached to the active matrix wafer. The spacing between the active matrix wafer and the glass wafer is largely determined by tiny beads in the sealing gasket around the pixel array on each display die.

The wafer is then diced into individual displays. The sapphire and glass are cut separately so that the circuits on the transparent substrate overhang the glass on one side to allow for electrical contact to the circuits, and the glass overhangs on the opposite side of the display to allow for electrical contact to the transparent common plate electrode on the transparent cover glass.

Liquid crystal 14 is then passed into a small hole in the spacer sealing gasket in each display die to fill the display area with liquid crystal. This small fill hole is then sealed.

It should be noted that it is possible to make some variations to the above described processing steps. For example, one can fabricate dielectric spacers in the active matrix array area rather than using spacers mixed with the gasket material. It is also possible to fill the entire panel with LC material before it is diced into individual panels. One can also use a VAN (vertically aligned nematic) mode liquid crystal. In this case, the organic polyimide layer would be replaced with an inorganic alignment layer.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A transparent display comprising:
    an electrically-controlled polarization modulating material;
    an addressing backplane that changes the polarization of light and electrically controls the polarization modulating material; and
    an internal polarization isolator to isolate the desired polarization effects of the polarization modulating material from the undesired polarization effects of the addressing backplane, the polarization isolator including a linear polarizer formed by patterning a one-dimensional wire grid array of closely-spaced metal lines on the electrically controlling side of the addressing backplane.

2. The transparent display of claim 1 in which the wire grid polarizer conducting layer is patterned into transparent pixel electrodes, with an interconnection of the wire grid lines within a pixel, isolating gaps between pixels, and an electrical connection from each pixel to the addressing backplane.

3. The transparent display of claim 1 in which the addressing backplane is a silicon layer containing an active-matrix integrated circuit.

4. The transparent display of claim 3 in which the polarization isolator is a linear polarizer integrated as part of the active-matrix integrated circuit.

5. The transparent display of claim 4 in which the polarizer is formed from a conducting layer in the integrated circuit which is patterned as a one-dimensional array of closely-spaced metal lines.

6. The transparent display of claim 1 in which the wire grid array is coated with a chemical mechanical polished silicon dioxide layer.

7. The transparent display of claim 1 in which the polarization isolator is formed from a resistive conducting layer deposited on an electrically controlling side of the addressing backplane and patterned as a one-dimensional array of closely-spaced lines to produce a wire grid polarizer which absorbs most of the polarized light which it does not transmit.

8. The transparent display of claim 7 in which the resistive conducting layer is made of polysilicon or nichrome.

9. The transparent display of claim 1 in which the addressing backplane includes a transparent substrate.

10. The transparent display of claim 9 in which the transparent substrate is sapphire.

11. The transparent display of claim 1 in which a conducting layer containing the wire grid polarizer is also patterned with solid areas that serve to block light from passing from the polarization modulating material into specific regions of the active matrix integrated circuit.

12. The transparent display of claim 1 in which the electrically-controlled polarization modulating material is a liquid crystal or other electro-optical material.

13. The transparent display of claim 3 in which the active-matrix integrated circuit includes CMOS circuits with a transistor and a capacitor controlling each pixel.

14. A polarization modulation isolator which isolates the desired polarization effects of a polarization modulating material from the undesired polarization effects of an addressing backplane in a transmissive display, the polarization isolator including a linear polarizer formed by patterning a one-dimensional wire grid array of closely-spaced metal lines on the side of the addressing backplane that faces the modulating material.

15. The polarization modulation isolator of claim 14 in which the wire grid polarizer conducting layer is patterned into transparent pixel electrodes, with: interconnection of the wire grid lines within a pixel, isolating gaps between pixels, and an electrical connection from each pixel to the addressing backplane.

16. A method of fabricating a transparent display, the method comprising:
    depositing silicon on a sapphire substrate;
    fabricating active matrix pixel addressing integrated circuits in the silicon;
    patterning an array of closely spaced metal conducting lines integrated on the active matrix pixel addressing circuits to form a wire grid polarizer;
    applying an alignment layer on the wire grid polarizer; and
    placing liquid crystal material adjacent the alignment layer.

17. The method of claim 16 in which the patterning of the wire grid polarizer includes forming a conducting structure that electrically interconnects to all the conducting lines within a pixel.

18. The method of claim 17 in which the wire grid polarizer is formed into transparent pixel electrodes by removing the grid lines from the space between adjacent pixels and fabricating a via to electrically connect the wire grid to the active matrix pixel addressing circuits.

19. The method of claim 17 in which the patterning of the wire grid polarizer includes the steps of sequentially exposing a negative photoresist to two patterns of light, one pattern of light for the conducting structure and one pattern of light for the wire grid lines.

20. The method of claim 18 in which the patterning of the wire grid polarizer includes the steps of sequentially exposing a positive photoresist to two patterns of light, one pattern of light for removing the grid lines from the space between adjacent pixels and one pattern of light for the wire grid lines.

21. The method of claim 17 in which the conducting structure is formed of small metallic islands in an integrated circuit interlayer dielectric below the wire grid conducting layer, such that each island spans at least two wire grid lines and the islands are positioned so that as a group they cause all the wire grid lines within a pixel to be electrically interconnected.

22. A transmissive microdisplay comprising:
   a transparent substrate;
   a silicon addressing integrated circuit on the transparent substrate including an array of pixel transparent electrodes on top of and controlled by the silicon active backplane;
   an alignment layer adjacent the addressing circuit;
   a transparent common plate;
   an alignment layer on the common plate;
   a liquid crystal material between alignment layers; and
   a polarizer integrated into the silicon addressing circuit to isolate the undesired polarization effects of the transparent substrate and the silicon active backplane from the desired polarization effect of the liquid crystal.

23. The microdisplay of claim 22 in which the polarizer is a one dimensional array of conductive lines patterned in the active silicon electrode backplane.

24. The microdisplay of claim 23 in which the array of conductive lines have a pitch less than half the wavelength of visible light.

25. The microdisplay of claim 23 in which the array is patterned to form an isolated island over every pixel.

26. The microdisplay of claim 23 in which the lines over each pixel are interconnected to form an electrode.

27. The microdisplay of claim 22 in which the polarizer is a layer coated over the pixel transparent electrodes.

28. The microdisplay of claim 22 in which the transparent substrate is sapphire.

29. The microdisplay of claim 26 in which the conducting lines are deposited on top of small metallic islands that each span between at least two lines and are positioned so that as a group they cause all the lines over one pixel to be interconnected to form an electrode.

30. The microdisplay of claim 29 in which one or more of the metallic islands include a via that connects to the silicon active backplane.

31. The microdisplay of claim 23 in which the metal used to form the conducting lines includes solid metal areas that block light from entering regions of the underlying silicon addressing circuit.

* * * * *